(12) United States Patent
Lundström et al.

(10) Patent No.: US 7,936,930 B2
(45) Date of Patent: May 3, 2011

(54) METHOD FOR REDUCING THE AMOUNT OF DATA TO BE PROCESSED IN A VISUALIZATION PIPELINE

(75) Inventors: Claes Lundström, Linköping (SE); Anders Ynnerman, Norrköping (SE); Patric Ljung, Linköping (SE)

(73) Assignee: Sectra Imtec AB, Linköping (SE)

( * ) Notice: Subject to any disclaimer, the term of this patent is extended or adjusted under 35 U.S.C. 154(b) by 930 days.

(21) Appl. No.: 11/587,303

(22) PCT Filed: Oct. 8, 2004

(86) PCT No.: PCT/EP2004/011290
§ 371 (c)(1), (2), (4) Date: Aug. 15, 2007

(87) PCT Pub. No.: WO2005/104037
PCT Pub. Date: Nov. 3, 2005

(65) Prior Publication Data
US 2008/0260271 A1 Oct. 23, 2008

(30) Foreign Application Priority Data
Apr. 21, 2004 (SE) .................................. 0401021

(51) Int. Cl.
*G06K 9/36* (2006.01)
(52) U.S. Cl. ...................................................... 382/232
(58) Field of Classification Search .......... 382/232–234, 382/236, 238–251; 348/395.1, 398.1, 403.1, 348/408.1, 420.1, 421.1; 375/240.18, 240.19, 375/240.24; 345/419, 424
See application file for complete search history.

(56) References Cited

U.S. PATENT DOCUMENTS

| | | | | |
|---|---|---|---|---|
| 7,065,260 | B2* | 6/2006 | Zhang et al. | 382/284 |
| 7,376,279 | B2* | 5/2008 | Dekel et al. | 382/240 |
| 7,489,825 | B2* | 2/2009 | Sirohey et al. | 382/244 |
| 7,502,501 | B2* | 3/2009 | Joshi | 382/128 |
| 7,609,265 | B2* | 10/2009 | Sloan et al. | 345/426 |
| 7,643,662 | B2* | 1/2010 | Gering | 382/128 |
| 7,689,539 | B2* | 3/2010 | Sjoblom et al. | 707/999.002 |

OTHER PUBLICATIONS

PCT/ISA/210—International Search Report—Oct. 10, 2006.
Anonymous; TAn v. 2, a Volume Visualization System; Apr. 27, 2001; pp. 1-2.
Guthe et al.; Interactive Rendering of Large Volume Data Sets; IEEE Visualization 2002; Oct. 27-Nov. 1, 2002; pp. 53-60.
J. El-Sana et al.; Integrating Occlusion Culling with View-Dependent Rendering; Proceedings Visualization 2001; IEEE; pp. 371-378.
Cignoni et al.; Simplification of Tetrahedral Meshes with Accurate Error Evaluation; Annual IEEE Conference on Visualization; Oct. 8-13, 2000; pp. 85-92.

(Continued)

*Primary Examiner* — Jose L Couso
(74) *Attorney, Agent, or Firm* — Venable LLP; Eric J. Franklin (57) ABSTRACT

A method for reducing an amount of data to be processed in a visualization pipeline. The visualization pipeline includes data capture, data compression, data storage, data decompression, and data rendering including the use of a transfer function. The data is divided into blocks in the compression and the reduction is achieved by adaptively selecting a level-of-detail for each block in the step of decompression utilizing a significance measure based on the transfer function.

26 Claims, 6 Drawing Sheets

OTHER PUBLICATIONS

Cignoni et al.; Multiresolution Representation and Visualization of Volume Data; IEEE Transactions on Visualization and Computer Graphics; vol. 3 No. 4, Oct. 1997; pp. 352-369.

Leven et al.; Interactive Visualization of Unstructured Grids Using Hierarchical 3D Textures; Proceedings IEEE/ACM Siggraph symposium on vol. visualization and graphics, Oct. 28-29, 2002; pp. 37-44.

Xinyue et al.; Time-Critical Multiresolution Volume Rendering using 3D Texture Mapping Hardware; Proceedings IEEE/ACM Siggraph symposium on volume visualization and graphics, Oct. 28-29, 2002; pp. 29-36.

Klosowski et al.; The Prioritized-Layered Projection Algorithm for Visible Set Estimation; IEEE Transactions on visualization and computer graphics; vol. 6, No. 2; Apr. 2000; pp. 108-123.

* cited by examiner

METHOD FOR REDUCING THE AMOUNT OF DATA TO BE PROCESSED IN A VISUALIZATION PIPELINE

CROSS-REFERENCE TO RELATED APPLICATIONS

This application claims priority to Swedish patent application 0401021-1 filed 21 Apr. 2004 and is the national phase under 35 U.S.C. §371 of PCT/EP2004/011290 filed 8 Oct. 2004.

FIELD OF THE INVENTION

The present invention relates to a method for reducing the amount of data to be processed in a visualization pipeline, which visualization pipeline comprises the steps of data capture, compression, storage, decompression and rendering comprising the use of a transfer function.

BACKGROUND OF THE INVENTION

Volumetric data sets routinely captured in imaging processes within many different technical fields are rapidly increasing in size due to improved imaging modalities. The large data sets imply new analysis possibilities, but do also cause severe performance limitations in visualization pipelines due to the large amount of data to be processed. A typical visualization pipeline comprises the steps of data capture, compression, storage, decompression and rendering. Furthermore, the step of rendering typically comprises the use of a transfer function, which i.a. describes the important range. When a transfer function is applied, large subsets of data give little or no contribution to the rendered image.

One field in which imaging is a very important tool is medicine. Medical imaging may be used for creation and analysis of medical images of an interior region of a body of a patient. Doctors and other medical personnel may use medical imaging in different stages of medical procedures such as diagnosis of, for example, injuries, diseases and abnormal conditions, surgery planning, treatment and postoperative evaluation. The medical data may, for example, be acquired utilizing computerized tomography (CT), nuclear magnetic resonance (NMR), magnetic resonance imaging (MRI), ultrasound, X-ray angiography or positron emission tomography (PET).

The size of standard volumetric data sets in medical imaging is rapidly increasing due to that newly developed medical imaging modalities provide for, for example, improved geometric resolution and decreased examination time, i.e. the imaging modalities are more efficient such that the time a specific examination procedure takes is decreased whereby more data may be captured during the limited time a patient is subject to examination.

Since increasingly precise information may be gathered in medical imaging, improved diagnostic procedures are possible and new types of examinations may be developed. For example, invasive methods may thereby be replaced with non-invasive methods to minimize patient risk and discomfort. However, as mentioned above, large data sets cause severe performance limitations in visualization pipelines due to the large amount of data to be processed.

In medical imaging, a medical transfer function is typically used in the step of rendering. The medical transfer function describes the diagnostically important range and sets color and opacity for tissue types. Often, more than 50% of the voxels do not contribute to the rendered image and, for example, a typical medical transfer function for CT volumes makes tissue with attenuation lower than fat completely transparent.

Potentially, the most important visualization method for medical diagnostic work on medical volumetric image data is "Direct Volume Rendering" (DVR). It is, however, a difficult task to introduce DVR into the diagnostic workflow (Andriole, 2003). Technical limitations in terms of memory and bandwidth pose challenges for the visualization pipeline, making interactive frame rates hard to reach and maintain.

Direct Volume Rendering techniques (Kaufman, 1991) have been the focus of vast research efforts in recent years. Many researchers have attempted to reduce the amount of data to be processed in the DVR pipeline while maintaining rendering quality.

Westermann, 1994, presents a multi-resolution framework for DVR where ray-casting rendering with adaptive sampling frequency is performed directly on the wavelet transformed data. Schneider et al., 2003, propose a compression and rendering scheme for DVR based on vector quantization. An advantage of this approach is the ability to both decompress and render on the graphics hardware. Furthermore, Guthe et al., 2002, achieve a multi-resolution representation through a blocked wavelet compression scheme. A level-of-detail (LOD) selection occurs in the decompression stage, whereby block resolution partly is prioritised according to the reconstruction error of different LODs.

Furthermore, some of the known methods for reduction of the amount of data to be processed in the DVR pipeline utilize the knowledge encoded in the transfer function in order to guide a selection of a level-of-detail (LOD).

Bajaj et al., 2001, explore the use of voxel visualization importance in the compression process by utilizing the knowledge encoded in the transfer function in the compression step. Voxel weights are defined, e.g. for DVR on the basis of transfer functions. Each wavelet coefficient is then modulated by the maximum weight in the voxel set that contributed to the coefficient. This aims to give the coefficients with most visual importance the largest magnitude. Furthermore, it is shown that application of a threshold to weighted coefficients yields higher quality than using unweighted ones. However, a drawback with this scheme is that the important visualization features need to be known at compression time. A further limitation for the resulting image quality is the use of the simple Haar wavelet. Introduction of a more advanced wavelet would make the weighting less precise, since each coefficient will depend on many more voxels if the wavelet filter support data increases. Still a further drawback of this scheme is that this scheme introduces lossy compression.

Sohn et al., 2002, suggest the use of volumetric features to guide compression, which in this case is applied to time-varying volumes. The features are defined in terms of iso-surface values or intensity ranges. Even though transfer functions are not explicitly used, the volumetric features represent the same type of visualization importance. The data is first passed through a block-based Haar wavelet compression stage. Blocks that have little or no contribution to the selected features are discarded. The wavelet coefficients can also be thresholded depending on their contribution to the features. However, a major limitation of this scheme too is that features must be selected before compression occurs.

The work by Li et al., 2002, aims to achieve constant frame rates for volume rendering. The volume is divided into sub-volumes of varying size, where coherent regions result in larger subvolumes. A multi-resolution pyramid for each subvolume is created by straight-forward averaging. Rendering time budgets are allocated to subvolumes according to an importance value which can be controlled, among other factors, by the maximum opacity in the subvolume. The full transfer function is not used, only the opacity component. This work does not explicitly require features to be selected at compression time, but on the other hand there is no description of how to handle feature importance changes, e.g. a change of transfer function. Furthermore, it is not shown how data reduction can be utilized outside the rendering stage, e.g. to lessen the impact of a low network bandwidth.

None of the above methods is capable of being incorporated with arbitrary existing visualization pipelines using multi-resolved data, for instance pipelines based on the JPEG2000 standard.

Thus, there is need for a simple way of achieving the ability to reduce the amount of data to be processed in a visualization pipeline while maintaining rendering quality and without requiring knowledge of rendering parameters or the transfer function in the step of compression, which would hinder transfer function changes during rendering. Furthermore, there is a need for such a method that do not introduce lossy compression and that may be incorporated with arbitrary existing visualization pipelines using multi-resolved data.

SUMMARY OF THE INVENTION

Accordingly, it is an object of the present invention to provide an improved method that provides for reduction of the amount of data to be processed in a visualization pipeline and that eliminates or at least reduces the above mentioned shortcomings of prior art.

This object is achieved through a method for reducing the amount of data to be processed in a visualization pipeline, which visualization pipeline comprises the steps of data capture, compression, storage, decompression, and rendering comprising the use of a transfer function, wherein the data is divided into blocks in the step of compression and wherein the reduction is achieved by adaptively selecting a level-of-detail for each block in the step of decompression utilizing a significance measure based on said transfer function.

Further embodiments of the present invention are specified in the dependent claims.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will in the following be described in more detail with reference to the accompanying drawings, in which.

DETAILED DESCRIPTION OF EMBODIMENTS

Embodiments of the method according to the present invention will in the following be described implemented in the field of medical imaging. However, it is not intended that the method according to the present invention is to be limited to implementation within the field of medical imaging. The method according to the present invention may also be implemented in other technical fields for reduction of the amount of data to be processed in a visualization pipeline. Non-limiting examples of other technical fields in which the method according to the present invention might be implemented are visualization within computational physics, meteorology, and oceanography.

As mentioned above, a typical visualization pipeline comprises the steps of data capture, compression, storage, decompression and rendering. In the step of rendering, a transfer function is used, which is a function that determines how an image is presented. A medical transfer function describes the diagnostically important range and sets color and opacity for tissue types.

The method according to the present invention is intended to be used for reducing the amount of data to be processed in a visualization pipeline of the above mentioned type while maintaining rendering quality. In a first embodiment according to the present invention, the data is divided into blocks in the step of compression through a blocking process and the reduction is achieved by adaptively selecting a level-of-detail (LOD) for each block in the step of decompression. The adaptive selection of the LOD for each block is performed utilizing a significance measure based on the transfer function, which normally is used in the step of rendering. Thus, according to the present invention the knowledge encoded in the transfer function is utilized in the step of decompression in order to reduce the amount of data to be processed, i.e. to select a LOD for each block such that the data for retrieval, reconstruction and rendering and thereby the required bandwidth in the pipeline is reduced, while maintaining rendering quality. The transfer function is introduced into the step of decompression by feeding the transfer function back from the step of rendering. Furthermore, methods for blocking are well-known in the art and need no further explanation herein.

The data may, for example, be volumetric data and the rendering method may, for example, be Direct Volume Rendering. Furthermore, the data may, for example, be medical data.

In the visualization pipeline, in which the method according to the present invention is intended to be implemented, data is acquired by the use of any of the techniques that are known in the art for acquiring medical data such as, for example, computerized tomography (CT), nuclear magnetic resonance (NMR), magnetic resonance imaging (MRI), ultrasound, X-ray angiography or positron emission tomography (PET). Furthermore, data is compressed according to any compression scheme known in the art in the step of compression. However, a prerequisite for the method according to the present invention is a multi-resolution data representation, enabling several LODs for each block. In addition, data is stored at, for example, a server or a workstation in the step of storage, decompressed according to any decompression scheme known in the art in the step of decompression and used for producing a computer generated image comprising the use of a transfer function in the rendering step.

In a second embodiment of the present invention, which second embodiment comprises the features of the first embodiment, the data is, after division into blocks, further transformed into a multi-resolution representation and encoded in the step of compression in the visualization pipeline. Methods for transformation and encoding are well-known in the art and need no further explanation herein. Furthermore, the data is then, after the level-of-detail selection, further decoded, inverse transformed from the multi-resolution representation to the selected level-of-detail and deblocked in the step of decompression in the visualization pipeline. Methods for decoding, inverse transformation as well as deblocking are well-known in the art and need no further explanation herein. The transform may, for example, be the Discrete Wavelet Transform.

Figure 1:
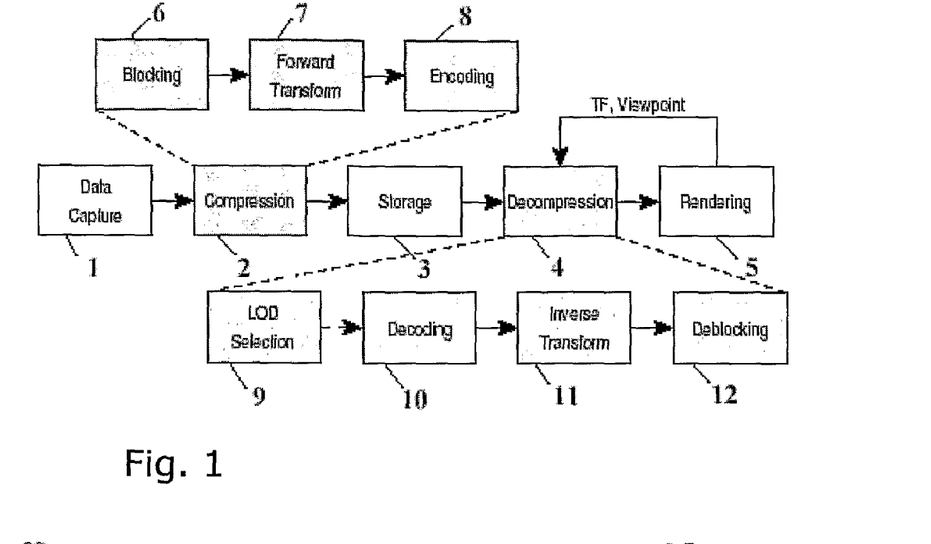
FIG. 1 shows schematically a typical visualization pipeline with the method according to the present invention implemented.

FIG. 1 shows schematically a typical visualization pipeline with the method according to the present invention implemented. The visualization pipeline in FIG. 1 comprises a data capture step 1, a compression step 2, a storage step 3, a decompression step 4 and a rendering step 5. The compression step 2 comprises a blocking step 6, a transformation step 7 and an encoding step 8. The decompression step 4 comprises a LOD selection step 9, a decoding step 10, an inverse transformation step 11 and a deblocking step 12. Input to the decompression step 4 is the transfer function (TF) and the viewpoint from the rendering step 5. The visualization pipeline with the method according to the present invention implemented provides the ability to reconstruct the data with an individual LOD for each block.

As mentioned above, a significance measure, which will be described in more detail below, based on the transfer function is used according to the present invention to guide the selection of a LOD for each block. Thus, the transfer function is used to guide the LOD selection process. More particularly, the transfer function content for a block is used to guide the selection of a LOD for a block. The transfer function (TF) is denoted by $\tau: \mathbb{R} \to \mathbb{R}^4$. The result of the transformation is a four component vector, where three components comprise the color information in RGB format, and the fourth component is called the alpha component and denotes the opacity. $\tau_{RGB}$ denotes the RGB component vector and $\tau_\alpha$ refers to the alpha component. The set of values that a block contains is denoted by $V_b$. The transfer function content (TF content) for the block is the set obtained by applying the TF to each value, i.e. the set $\tau(v)$, $v \in V_b$. The LOD selection for a block depends on the TF content as follows:

1. No TF content, $\tau_\alpha(v)=0$, $\forall v \in V_b$: The block may be discarded without introducing distortion.
2. Non-varying TF content $\tau(v)=C$, $\forall v \in V_b$, where C is a vector constant. The block may be reduced to a single average value without introducing distortion.
3. Varying TF content, $\exists u, v \in V_b$, such that $\tau(u) \neq \tau(v)$: Low distortion is achieved by letting the LOD depend on the derivative of the TF in the range of $V_b$, a high derivative implies high resolution.

Each time the selected LOD is less than full resolution for a block a de facto compression is obtained. In the cases of no or non-varying TF content, the LOD reduction results in a lossless compression. In the cases of varying TF content, the LOD selection is according to the present invention performed based on the significance measure, which will be described further below.

In a third embodiment of the present invention, which third embodiment comprises the features of the first or the second embodiment, cubic blocks of size $2^j$, where j is an integer >0, are used, transformation into multi-resolution representation of the blocks is performed in the step of compression and j+1 different levels of detail, $\lambda = 2^j, 2^{j-1}, \ldots, 2^0$ corresponding to cubes with sides $2^j, 2^{j-1}, \ldots, 2^0$, respectively, are used. For example, $16^3$ blocks may be used and then five different LODs corresponding to different resolutions, cubes with sides 16, 8, 4, 2 and 1, respectively, are used in the LOD selection process. The level-of-detail $\lambda$ may then have the values 16, 8, 4, 2, 1. The resolution levels are denoted by $L_{16}$, $L_8$, $L_4$, $L_2$ and $L_1$. Thus, in the LOD selection process any of the LODs $\lambda=16, 8, 4, 2$ or 1 is selected for a block when $16^3$ blocks are used. However, if the block has no TF content, the block may be discarded without introducing distortion. Furthermore, if the TF content of a block is non-varying, the lowest level of detail, $\lambda=1$, may be selected without introducing distortion.

Furthermore, in the third embodiment of the present invention the significance measure is a High Quality (HQ) version significance measure $s_{HQ}(\lambda)$, which is derived for each level $\lambda$ of each block through an exhaustive analysis: Find the TF content for each LOD and then calculate the distortion compared to the TF content at full resolution. The distortion measure $\Delta E$ used is the CIELUV distortion measure, which is defined below. In this comparison each LOD is represented by a $16^3$ block, achieved by wavelet expansion with zero coefficients as described in the experimental section below. Equations 1 and 2 describe how $s_{HQ}(\lambda)$ is derived. The voxel value for level $\lambda$ at position p is denoted by $v_{p,\lambda}$, whereby each LOD is expanded to full resolution through interpolation to fill the positions p. Furthermore, the RGB to CIELUV conversion is represented by $\mathcal{L}$ and explained below. $\tau$ denotes the transfer function, $\tau_{RGB}$ denotes the RGB component vector and $\tau_\alpha$ denotes the alpha component.

$$\tau^*(v) = \mathcal{L}(\tau_\alpha(v)\tau_{RGB}(v)) \tag{1}$$

$$s_{HQ}(\lambda) = \left[\frac{1}{2^{3j}} \sum_p \Delta E(\tau^*(v_{p,\lambda}), \tau^*(v_{p,2^j}))^2\right]^{1/2} \tag{2}$$

$$\lambda = 2^{j-1}, \ldots, 2^0$$

The CIE 1976 L*u*v* (CIELUV) is a standardized color space for luminous colors, i.e. color monitors and television. It approximately incorporates perceptual aspects of the human eye. Although advanced color appearance models exist (Fairchild, 1998), the CIELUV color space is adequate for difference measures of the work presented in this application.

The conversion, $\mathcal{L}_t$, of R,G,B components to the L u v components is performed in two steps. First, the RGB colors are transformed into CIEXYZ tristimulus coordinates using equation 3. Unfortunately, the RGB color components used in computer graphics do not refer to any particular standardized color space. Therefore, we have approximated the RGB colors to be the standardized sRGB colors ($RGB_{709}$) (Geneva, 1990; Poynton, 1997).

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \cdot \begin{bmatrix} R_{709} \\ G_{709} \\ B_{709} \end{bmatrix} \quad (3)$$

In the second step, the tristimulus XYZ are converted to L*u*v* using equations 4 through 8 (Fairchild, 1998). The white-point, $(X_n,Y_n,Z_n)$, in the CIE XYZ color space is computed from $RGB_{709}$=(1,1,1). Using $X_n, Y_n$, and $Z_n$ in equations 5 and 6 give $u'_n$ and $v'_n$, respectively.

$$L^* = \begin{cases} 116(Y/Y_n - 16)^{1/3} & Y/Y_n > 0.008856 \\ 903.3(Y/Y_n) & \text{otherwise} \end{cases} \quad (4)$$

$$u' = \frac{4X}{X + 15Y + 3Z} \quad (5)$$

$$v' = \frac{9Y}{X + 15Y + 3Z} \quad (6)$$

$$u^* = 13L^*(u'-u'_n) \quad (7)$$

$$v^* = 13L^*(v'-v'_n) \quad (8)$$

The CIE76 ΔE color-difference is defined in the CIELAB color space. In the work in this application CIE76 ΔE is adopted to the CIELUV color space, as defined in equation 9. Individual pixel errors with ΔE around and below 1 are likely to be invisible to the human eye. In common practice, errors below a few units in ΔE are considered good quality and commonly not noticed by observers. It should be noted that ΔE in this application refers to $\Delta E^*_{uv}$.

$$\Delta E^*_{uv} = (\Delta L^{*2} + \Delta u^{*2} + \Delta v^{*2})^{1/2} \quad (9)$$

The exhaustive analysis needed for the $s_{HQ}$ is very slow and must be performed on decompressed data and, thus, is of little use in a real pipeline. The $s_{HQ}$ is preferably used in research context.

In the third embodiment the LOD for each block is consequently selected based on the High Quality version significance measure. A high value of the significance measure for a LOD corresponds to a large visual distortion if the block would be rendered at the given LOD, whereas a low value means that the block can be reduced to this LOD with little impact on visual quality.

In a fourth embodiment of the present invention, which fourth embodiment comprises the features of the first or the second embodiment, cubic blocks of size $2^j$, where j is an integer >0, are used, wavelet transformation of the blocks is performed in the step of compression, j+1 different levels of detail, $\lambda=2^j, 2^{j-1}, \ldots, 2^0$ corresponding to cubes with sides $2^j, 2^{j-1}, \ldots, 2^0$, respectively, are used and block specific meta-data acquired in the step of compression are used. The used meta-data comprises an average $\bar{x}$, a root mean square wavelet coefficient $C_{RMS}(\lambda)$ for each level-of-detail λ and a simplified histogram. For example, $16^3$ blocks may be used and then five different LODs corresponding to different resolutions, cubes with sides 16, 8, 4, 2 and 1, respectively, are used in the LOD selection process. The level-of-detail λ may then have the values 16, 8, 4, 2, 1. The resolution levels are denoted by $L_{16}, L_8, L_4, L_2$ and $L_1$. Thus, in the LOD selection process any of the LODs λ=16, 8, 4, 2 or 1 is selected for a block when $16^3$ blocks are used. However, if the block has no TF content the block may be discarded without introducing distortion. Furthermore, if the TF content of a block is non-varying, the lowest level of detail, λ=1, may be selected without introducing distortion.

Furthermore, in the fourth embodiment of the present invention the significance measure is a Fast version significance measure $S_F(\lambda)$, which employs a less time-consuming approach based on block specific meta-data acquired at compression time: the average $\bar{x}$, the root mean square wavelet coefficient $C_{RMS}(\lambda)$ for each level-of-detail λ, and a simplified histogram. Their respective use is described below. The memory overhead introduced by the meta-data is minor and it is also straightforward to give it a condensed representation.

Figure 2A:
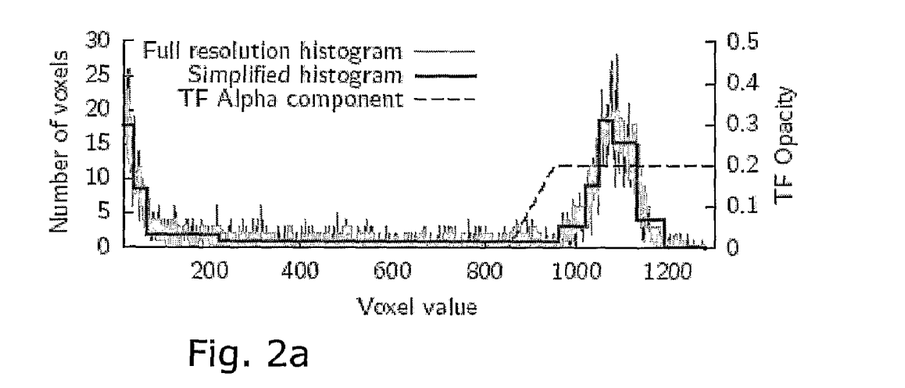
FIG. 2a shows an example of a block histogram from a medical CT volume and its piece-wise constant approximation using 12 segments.

The simplified histogram reduces the full histogram of a block to a number of piece-wise constant segments and is constructed as follows. The value range of the block is divided into small segments. Each segment height is set as the average of the original histogram in the segment range. Pairs of segments are then iteratively merged until just a few remain. At each step the pair with least height difference is merged. This method preserves the shape of the original histogram well, since segments at steep slopes will not be merged. FIG. 2a shows an example of a block histogram from a medical CT volume and its piece-wise constant approximation using 12 segments.

A parameter in the simplification is the final number of segments. Performance turned out to be only marginally affected by this parameter. Instead the trade-off is between less meta-data (few segments) and higher simplification quality (many segments). The use of a limit of 12 segments has resulted in close to optimal quality with little storage overhead. The initial segment width has been set to 10. Tests have shown that the quality of the LOD selection does not increase for smaller widths. A larger width would increase performance, but the quality loss is significant.

Figure 2B:
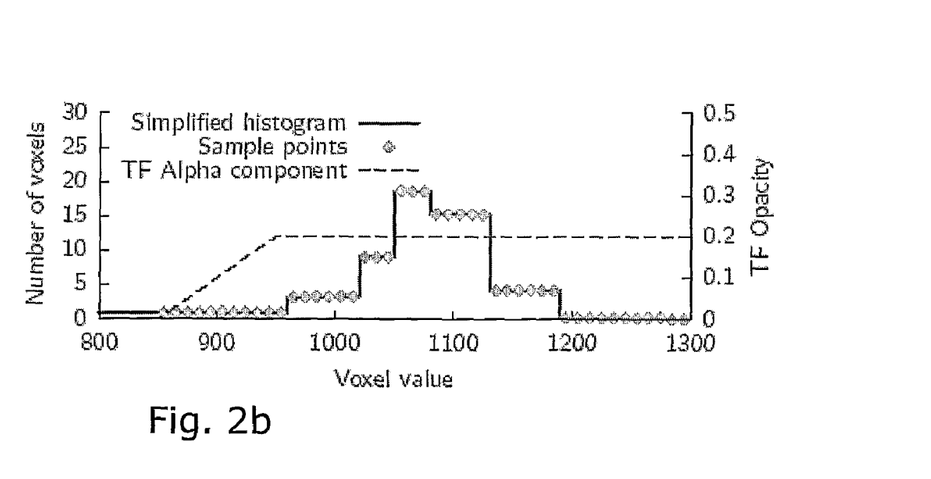
FIG. 2b shows an example of retrieval of TF content from a simplified histogram by sampling (dots) at small intervals in the TF range.

Having collected the meta-data during compression, $s_F(\lambda)$ is derived for all levels λ at the decompression stage. The first step is to calculate $s_F(1)$, the reduction of TF content obtained when going from $L_{16}$ to $L_1$. The simplified histogram is sampled at small intervals, applying the TF to each sample. The ΔE distortion for the interval is retrieved by comparing with $\tau(\bar{x})$, where the block average x is used to approximate the $L_1$ TF content. The distortion must then be multiplied by the number of voxels in the interval. Finally, all interval distortions are added. The summation is simplified by making a single term of the samples outside the TF range, since they all have $\tau_\alpha=0$. FIG. 2b shows an example of retrieval of TF content from the simplified histogram by sampling (dots) at small intervals in the TF range. Equations 1 and 10 describes how $s_F(1)$ is derived. A histogram interval has an index i, a midpoint $x_i$, a height $h_i$, and all intervals have the same width w. The interval width used is 10, the same as the minimum segment width. Furthermore, the RGB to CIELUV conversion is represented by $\mathcal{L}$ and explained above. τ denotes the transfer function, $\tau_{RGB}$ denotes the RGB component vector and $\tau_\alpha$ denotes the alpha component. The distortion measure $\Delta E$ used is the CIELUV distortion measure, which is defined above.

$$\tau^*(v) = \mathcal{L}(\tau_\alpha(v)\tau_{RGB}(v)) \quad (1)$$

$$s_F(1) = \left[\frac{1}{2^{3j}} \sum_i \Delta E(\tau^*(x_i), \tau^*(\bar{x}))^2 \cdot h_i \cdot w\right]^{1/2} \quad (10)$$

The overall TF content reduction of a block is described by $s_F(1)$. The next step is to derive how it is distributed over the intermediate levels, such as $s_F(8)$ corresponding to the $L_{16}$ to $L_8$ transition, etc. A large difference in TF content roughly corresponds to large changes of the voxel values between the levels, i.e. in large wavelet coefficients. Thus, by comparing the root mean square coefficients $C_{RMS}(\lambda)$ for all levels $\lambda$, an appropriate portion of the total distortion can be assigned to each level. The derivation is described in equations 11 and 12.

$$C_{acc}(\lambda) = \sum_{\lambda' > \lambda} C_{RMS}(\lambda') \quad \lambda = 2^{j-1}, \ldots, 2^0 \quad (11)$$

$$s_F(\lambda) = s_F(1) \cdot \frac{C_{acc}(\lambda)}{C_{acc}(1)} \quad \lambda = 2^{j-1}, \ldots, 2^1 \quad (12)$$

In the fourth embodiment the LOD for each block is consequently selected based on the Fast version significance measure. A high value of the significance measure for a LOD corresponds to a large visual distortion if the block would be rendered at the given LOD, whereas a low value means that the block can be reduced to this LOD with little impact on visual quality.

Furthermore, in a fifth embodiment comprising the features of any of the first, second, third or fourth embodiments, the adaptive selection of a level-of-detail for each block in the step of decompression utilizing a significance measure based on said transfer function is performed by utilizing a significance priority scheme based on said significance measure.

A sixth embodiment is a variant of the fifth embodiment, which sixth embodiment comprises the features of the fifth embodiment and in which sixth embodiment a priority scheme is utilized having the following outline. First all blocks with no significance according to the significance measure are removed from further pipeline processing. The remaining blocks are then allocated a current LOD property and are thereafter subject to updates in a transition process. A priority queue is created comprising all valid LOD transitions for all blocks, whereby a transition is valid when it goes from lower to higher level-of-detail. The queue is then sorted according to a transition efficiency measure, which is based on the significance measure. Finally, the queue of transitions is traversed from the top, updating the current LOD for remaining blocks.

The allocated current LOD may, for example, be set to the lowest LOD used. If $16^3$ blocks are used the lowest LOD is $L_1$.

Furthermore, a stopping criterion may be set in the sixth embodiment, whereby the priority queue is traversed until the stopping criterion is reached. The amount of data added in each transition between different LODs may be registered enabling a stopping criterion based on desired compression ratio.

The transition efficiency measure may, for example, be a relative significance measure $\Delta s$. Consider the two levels involved in a block LOD transition. The relative significance is the difference in significance divided by the difference in size.

If the significance measure is a high quality version significance measure, the transition efficiency measure is a high quality version relative significance measure, $\Delta s_{HQ}(\lambda_a,\lambda_b)$, derived according to equation 13. $N_i$ is the size of level $\lambda_i$.

$$\Delta s_{HQ}(\lambda_a, \lambda_b) = \frac{s_{HQ}(\lambda_b) - s_{HQ}(\lambda_a)}{N_a - N_b} \quad \lambda_a > \lambda_b \quad (13)$$

If the significance measure is a fast version significance measure, the transition efficiency measure is a fast version relative significance measure, $\Delta s_F(\lambda_a,\lambda_b)$, derived according to equation 14. $N_i$ is the size of level $\lambda_i$.

$$\Delta s_F(\lambda_a, \lambda_b) = \frac{s_F(\lambda_b) - s_F(\lambda_a)}{N_a - N_b} \quad \lambda_a > \lambda_b \quad (14)$$

A seventh embodiment is a variant of the sixth embodiment comprising all the features thereof and whereby the significance priority scheme is a high quality version significance priority scheme and the high quality version relative significance measure, $\Delta s_{HQ}(\lambda_a,\lambda_b)$ is utilized. The high quality scheme is implemented as an iterative solution. A remaining block will then only have one valid LOD transition at a time. The valid LOD transition may, for example, be the transition with the highest $\Delta s_{HQ}$ connected to the current LOD. For instance, if $16^3$ blocks are used, a block at $L_2$ will find the valid transition among $L_2 \rightarrow L_4$, $L_2 \rightarrow L_8$, and $L_2 \rightarrow L_{16}$. When the block at the top of the queue registers its transition, a new valid transition maximizing $\Delta s_{HQ}$ is found and reinserted into the priority queue when the current level-of-detail is updated.

Thus, in the seventh embodiment the LOD for each block is selected based on the high quality version significance priority scheme, which in turned is based on the high quality version significance measure.

An eighth embodiment is another variant of the sixth embodiment comprising all the features thereof and whereby the significance priority scheme is a fast version significance priority scheme and the fast version relative significance measure, $\Delta s_F(\lambda_a,\lambda_b)$ is utilized. For performance reasons the Fast scheme is not iterative. The priority queue is populated with all possible transitions, i.e. several instances for each block. Thus, each possible valid level-of-detail transition for a remaining block is comprised in the priority queue as a transition candidate. The $\Delta s_F$ for each transition is calculated initially. Some transitions depend on others, for example, if $16^3$ blocks are used, $L_2 \rightarrow L_8$ cannot occur unless $L_1 \rightarrow L_2$ has occurred. A conflict arises if a dependent transition is set higher in the queue than its predecessor. This may, for example, be handled by setting the $\Delta s_F$ of the dependent transition just below the value of its predecessor, putting it lower in the priority queue. Another situation to handle is when a transition invalidates a later one, e.g. making the transition $L_1 \rightarrow L_8$ invalidates $L_4 \rightarrow L_8$ if $16^3$ blocks are used. The employed solution may, for example, be to always ignore transitions that do not start at the current LOD of the block. From tests it has been learned that the $L_2$ level are rarely used in the resulting LOD selections. Therefore, this level may be removed from the Fast priority scheme to increase performance. This simplification reduces the possible LOD transitions from 10 to 6 if $16^3$ blocks are used, which in turn reduces the size of the priority queue by 40%.

Thus, in the eighth embodiment the LOD for each block is selected based on the fast version significance priority scheme, which in turned is based on the fast version significance measure.

Furthermore, a block may skip intermediate LOD transitions in both the high quality scheme according to the seventh embodiment and in the fast scheme according to the eighth embodiment. If only the next higher level would be considered, many blocks would erroneously remain at a lower level. For example, if $L_1$ and $L_2$ have similar significance, $s(1) \approx s(2)$, the block would not be likely to ever get to $L_2$ even if $s(8)$ was very high.

In order to achieve a close to lossless rendering, either priority scheme is by-passed by setting all blocks with non-zero significance directly to $L_{16}$. A perfect rendering is not achieved, since small errors in some cases occur when a ray crosses a block boundary in the rendering. The test results presented in the experimental section show, however, that the resulting distortion is not perceivable, which is why this setting is referred to as virtually lossless.

In a ninth embodiment comprising the features of any of the previously mentioned embodiments, the data is volumetric and occlusion of a block is accounted for by weighting said significance measure with an average transparency in the rendering of the parts of the volume in front of the block at a current viewpoint.

In the case of a rendering with high opacity, large parts of the volume will be completely or partially obscured. Even if an occluded block has, in itself, TF content, this will never reach the viewer. Therefore, using the TF to estimate occlusion effects enables LOD reduction possibilities in addition to the significance measures. In fact, occlusion adjustment is an essential LOD selection component for many TFs. A model for occlusion according to the present invention simulates a low resolution ray-casting renderer. Input to the ray-caster is the current viewpoint and the simplified histograms for each block. A block is occluded if the incoming light intensity is low, therefore this value is noted during the simulated rendering. The occlusion is accounted for by weighting the significance measures, $s_{HQ}$ or $s_F$, with the average incoming intensity for each block. The weighting occurs prior to the priority schemes. The occlusion footprint (the outgoing light intensity) for each block is obtained by simplifying the discrete rendering equation (equation 15, no emission factor). $I_{in}$ is the incoming light intensity into a block, $I_{out}$ is the outgoing, and $\alpha_i$ is voxel opacity.

$$I_{out} = I_{in} \prod_i (1 - \alpha_i) \qquad (15)$$

By utilizing the simplified histogram described above, an estimated average opacity, $\overline{\alpha}$, may be calculated of each block. A naive simplification would be to replace each voxel opacity by the average, i.e. $I_{out}=I_{in}(1-\overline{\alpha})^{\overline{n}}$, where $\overline{n}$ is the average number of ray samples through the block. More precision is obtained if only the non-zero opacities are considered which introduces $\overline{\alpha}_{nz}$ and $\overline{n}_{nz}$.

However, two main error sources need to be handled. The average opacity will cause an overestimation of $I_{out}$. As a simple example, consider two voxels along the ray with opacities 0.8 and 0, resulting in a reduction of incoming light of 80%. The average approach approximates this by two voxels of opacity 0.4, making the reduction only 64%. The second error source is the average number of ray samples, underestimating $I_{out}$. Rays with fewer samples than average will contribute more to the outgoing intensity in relation to rays with more samples. Consider two rays with 1 and 3 samples, all with opacity 0.5. The intensity reduction will be 50% and 88% for the rays, an average of 69%. However, the reduction for the ray sample average of 2 is as high as 75%. These observations lead to the enhanced approximation model described in equation 16. Empirical tests have led to use of $c_\alpha=1.3$, $c_n=0.5$ for an abdomen data set, and $c_\alpha=1.2$, $c_n=0.1$ for a heart data set. A more advanced approach would automatically adapt these constants to the properties of each data set. A more advanced approach would automatically adapt these constants to the properties of each data set.

$$I_{out}=I_{in}(1-c_\alpha \overline{\alpha}_{nz})^{c_n \overline{n}_{nz}} \qquad (16)$$

The intent of the High Quality scheme is to explore the full potential of TF based LOD selection, with little use outside the research context. Its results also serve as a high-end benchmark for the Fast scheme, which is designed to be usable in a real-time visualization pipeline. The Fast scheme is intended to achieve results close to the High Quality scheme while reducing processing time.

Furthermore, according to the present invention, a metric based on distortion in the rendered images rather than the distortion in the reconstructed volumes is used. The reason for this is primarily that the distortion in the reconstructed volumes has a reduced correspondence to the final result after application of the TF. Secondly, a view dependent LOD also makes a distortion measure on the volume data after application of a TF less feasible. Thus, a quality measure based on the distortion of the rendered images using the perceptually adapted CIELUV color space is used.

The major advantage of the method according to the present invention is that it exploits the data reduction potential of feeding back the TF into the decompression stage. Accordingly, no a priori information of TFs or other rendering parameters is needed at compression time. Since this data reduction can benefit all stages of the visualization pipeline from retrieval through decompression to rendering it is referred to as a de facto compression.

Furthermore, the adaptive decompression scheme according to the present invention provides a significant performance improvement for both lossless and lossy compression. The scheme may also readily be applied on top of other DVR pipelines working with multi-resolution representations, enhancing existing compression ratios. Another important advantage is that the original full quality data is always accessible, since no irreversibly lossy compression is introduced. The invention also provides good user interaction possibilities in the visualization, since there is a rapid adaptation to changes in TF and viewpoint.

The results presented in the experimental section demonstrates a significant reduction in the required amount of data while maintaining rendering quality when the High Quality scheme or the Fast scheme is used. In virtually lossless mode the High Quality scheme achieves a de facto decompression ratio of about 8:1. In a virtually lossless setting the Fast scheme performs as well as the High Quality scheme. For increasing compression ratios, the Fast scheme performance relative to the High Quality scheme decreases.

EXPERIMENTAL

Pipeline Details

For the results reported herein, the pipeline uses the 5/3 wavelet, a symmetric biorthogonal spline wavelet supporting lossless compression (Calderbank et al., 1996). At block boundaries, symmetric extension has been employed (Brislawn, 1995). The 5/3 filter has a relatively small kernel while achieving good decorrelation. This wavelet has previously been used in blocked compression schemes for visualization (Guthe et al., 2002) and is also used in the IPEG-2000 standard (Adams, 2001). The transforms have been implemented using the lifting scheme (Sweldens, 1996).

Block LODs below $L_{16}$ are constructed by feeding a stream of zero-valued coefficients to the inverse wavelet transform for the remaining levels up to full resolution. The 5/3 filter performs linear interpolation except on the boundary where the sample value is repeated. For the interior interpolated samples this scheme emulates typical trilinear interpolation performed in volume rendering.

A Huffman encoder (Huffman, 1952) is used to achieve fairly high compression ratios with fast decompression, as demonstrated by Guthe et al., 2002. To benefit from the many short zero sequences in the coefficients from our lossless wavelet transform, a few extra Huffman symbols for seven, four, and two zeros in sequence are introduced.

To enable measurements with low quantization noise a software ray caster based on floating point arithmetic is implemented. The transfer function has full resolution in the sample range, 12 bits, and the rendered images are saved at 15 bits per component, i.e. 60 bits per RGBA pixel. The transfer function is pre-integrated using an approximation of the rendering integral (Engel et al., 2001) and stored in a look-up table.

Distortion Metric

The common distortion metric for volume compression schemes is to measure the accuracy of the reconstructed volume compared to the original, referred to as reconstruction distortion. The two main measures used are the peak signal to noise ratio (PSNR) (Nguyen et al., 2001) and signal to noise ratio (SNR) (Schneider et al., 2003), both based on root mean squared error (RMSE). These measures do not take the TF into account, thereby being of limited use to evaluate quality in the rendered image, which is the essential measure herein. The TF based LOD selection may cause a large reconstruction distortion while retaining visual fidelity. Thus, a distortion measure applied to the rendered image, rendered distortion, is proposed. The pixel-wise difference, $\Delta E$, is defined in the CIELUV color space. Comparing two images, $\Delta E$ is computed for each pixel. As a measure of average rendered distortion, $\Delta E_{RMS}$ is defined, the root mean square of the pixel $\Delta E$ values.

A limitation of $\Delta E_{RMS}$ is the inability to pick up individual pixels with high distortion. To enhance the fidelity of the measurement, a second measure $\Delta E_6$ is proposed, defined as the ratio of pixels with $\Delta E>6.0$. This threshold is feasible since pixel distortion of a few units is unlikely to cause misinterpretations of the image data.

Results

Tests have been performed on three medical CT volumes, a chest, an abdomen, and a heart, of dimensions $512^3$, 512×512×384, and 512×448×416 voxels, respectively. The compression ratio measurements are calculated based on the data range of 12 bits per voxel. The presented ratios refer to the total de facto compression, i.e. combining the entropy encoding effect at compression time with the LOD selection effect. One voxel spans approximately one pixel in the rendered images, i.e. the image sizes are around $512^2$.

Figure 3A:
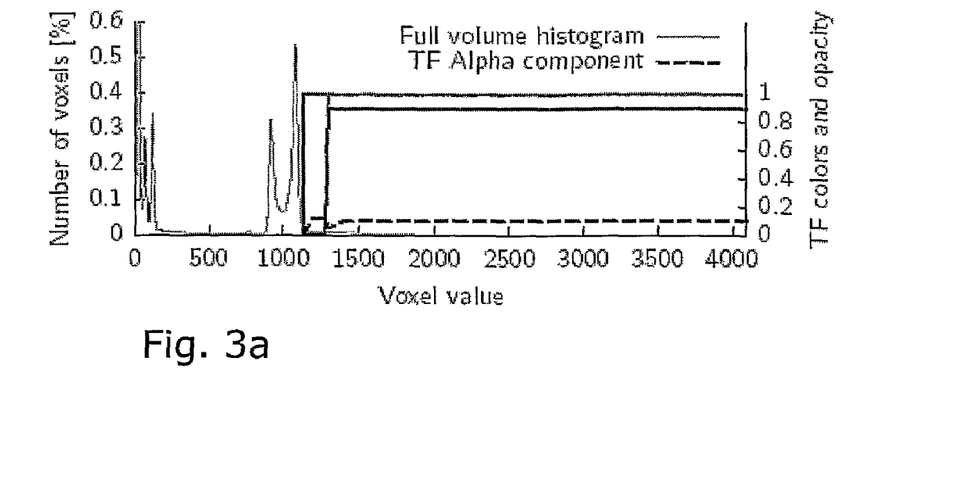
FIG. 3a-c show transfer functions (TFs) and histograms used for an abdomen data set, a chest data set and a heart data set, respectively.
Figure 3B:
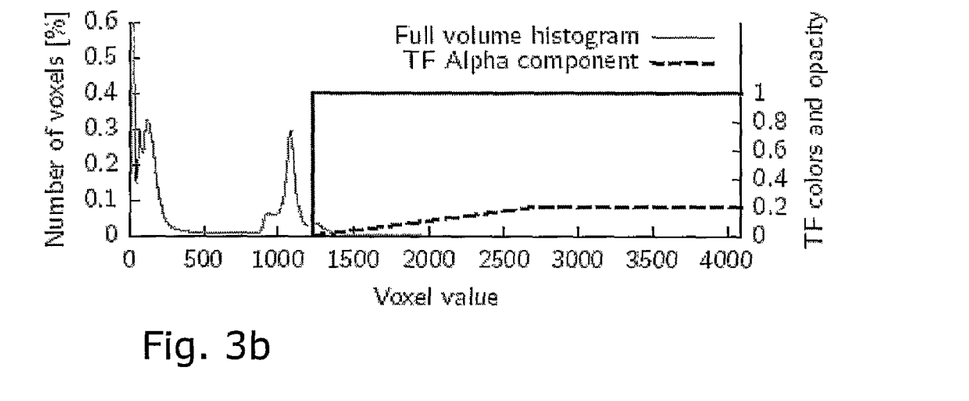
Figure 3C:
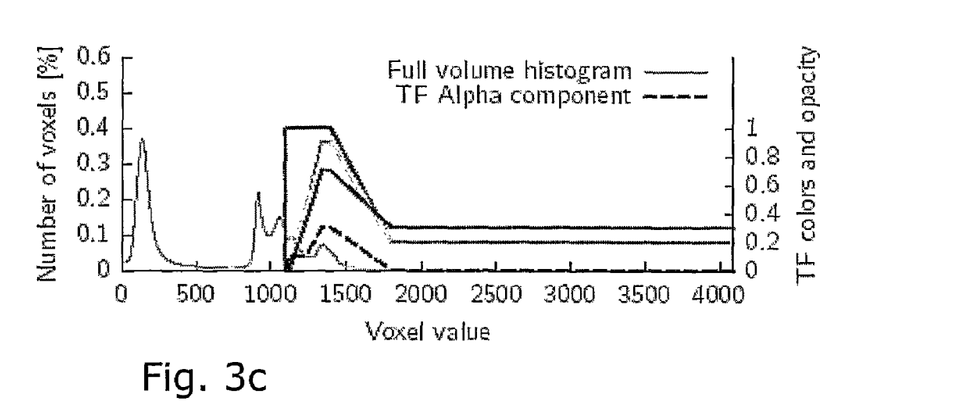

The data sets and TFs are from actual clinical use at CMIV, Center for Medical Image Science and Visualization, Linköping University, Linköping, Sweden. The TFs and histograms are presented in FIGS. 3a-c. FIG. 3a refers to the abdomen data set, FIG. 3b refers to the chest data set and FIG. 3c refers to the heart data set. The horizontal lines in the heart are artifacts due to the fact that the capturing process extends over several heart cycles, one volume slab being captured at a certain phase of each cycle. Since the chest volume is rendered with a low opacity TF, no occlusion correction has been used. Occlusion correction is not used in virtually lossless settings for any data set.

In order to roughly evaluate the potential of TF guided adaptive decompression, the HQ scheme according to the present invention have been compared with a traditional compression scheme based on quantization of wavelet coefficients (WQ). The quantization is level dependent, with larger step size for higher resolution coefficients. The zero sequence enhanced Huffman encoding is used for the traditional scheme as well.

Figure 4A:
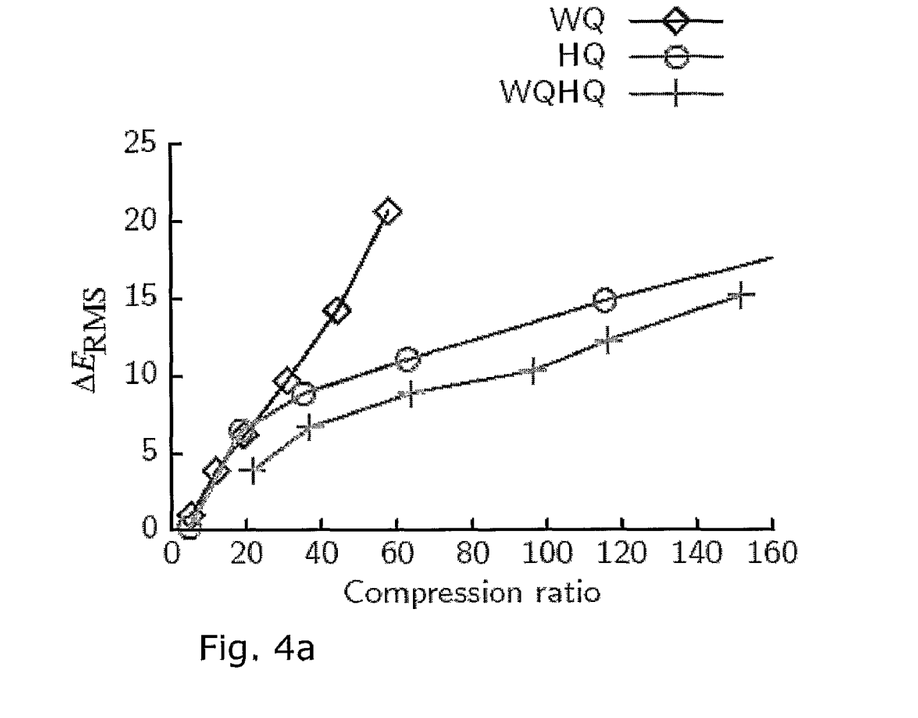
FIG. 4a shows a comparison between Wavelet Quantization (WQ) based compression, High Quality (HQ) adaptive decompression and a combination of WQ and HQ in WQHQ on a heart data set. The root mean square of the pixel $\Delta E$ values, $\Delta E_{RMS}$, is shown against compression ratio.
Figure 4B:
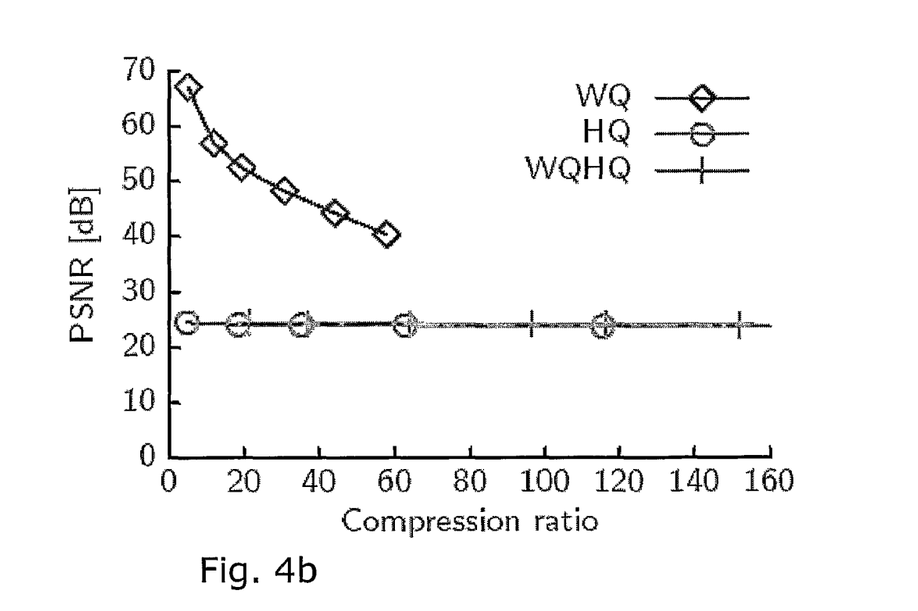
FIG. 4b shows a comparison between Wavelet Quantization (WQ) based compression, High Quality (HQ) adaptive decompression and a combination of WQ and HQ in WQHQ on a heart data set. The Peak Signal-to-Noise Ration (PSNR) is shown against compression ratio.

The heart data set is a difficult case for a LOD selection approach with many narrow features. FIG. 4a-b show the results for the heart data set, whereby a comparison between Wavelet Quantization (WQ) based compression, the High Quality (HQ) adaptive decompression and a combination of WQ and HQ in WQHQ is shown. FIG. 4a shows $\Delta E_{RMS}$ against compression ratio. FIG. 4b shows the Peak Signal-to-Noise Ration (PSNR) against compression ratio. The HQ scheme results in much less rendered distortion than WQ for high compression ratios. For the lowest ratio, HQ is also significantly better than WQ. In addition, the HQ scheme have been combined with the lossy WQ compression to demonstrate that the two schemes work well together. This combination proved to be the best method in terms of rendered distortion.

The results also demonstrate that high reconstruction distortion (low PSNR) does not necessarily lead to high rendered distortion ($\Delta E_{RMS}$, $\Delta E_6$), see FIG. 4b. In effect, the proposed method show no correspondence between a PSNR measure and the rendered image distortion.

Figure 5A:
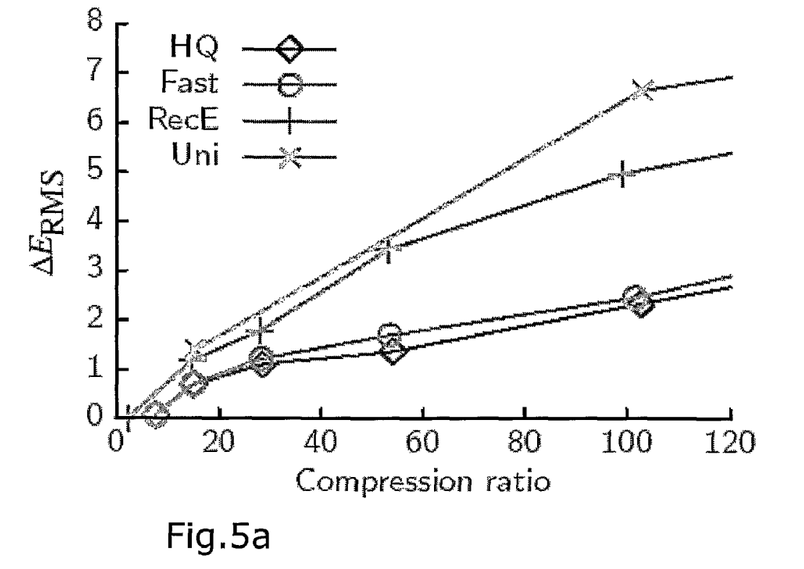
FIGS. 5a and 5b show a compression versus quality comparison between High Quality (HQ), Fast (Fast), Reconstruction Error (RecE) and a uniform down-sampling (Uni) for chest data.
Figure 5B:
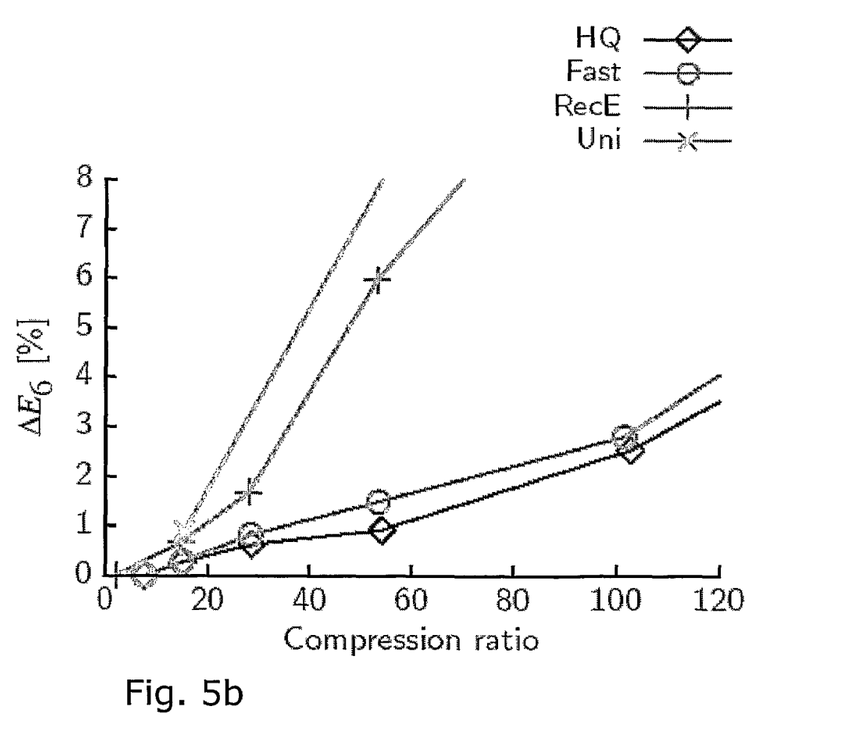
Figure 5C:
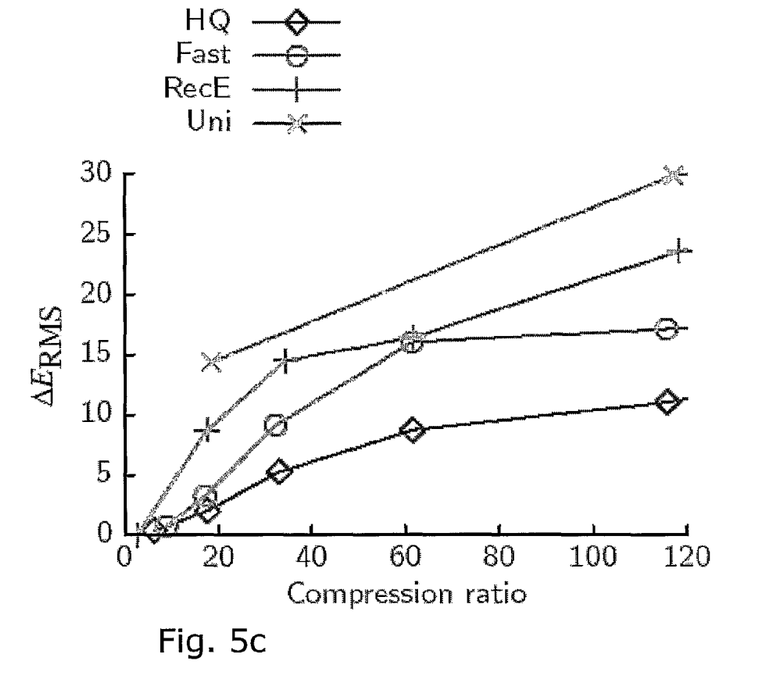
FIGS. 5c and 5d show a compression versus quality comparison between High Quality (HQ), Fast (Fast), Reconstruction Error (RecE) and a uniform down-sampling (Uni) for abdomen data.
Figure 5D:
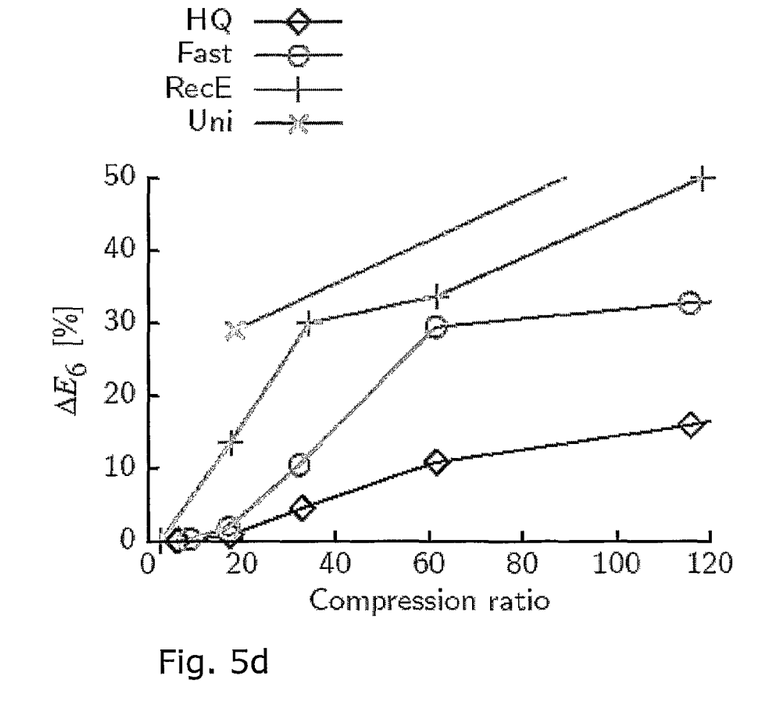

Furthermore, HQ was also compared to other LOD selection schemes. A low quality benchmark is Uni consisting of a uniform LOD scheme where the blocks are all reduced to $L_8$ or $L_4$. A second reference is RecE, a LOD selection based on the distortion in the reconstruction according to the $L_2$ norm (an RMSE), an approach partly used by Guthe et al., 2002. The results are shown in FIGS. 5a-d, which show compression versus quality comparison between High Quality (HQ), Fast (Fast), Reconstruction Error (RecE) and a uniform down-sampling (Uni). FIGS. 5a-b refers to the chest data and FIGS. 5c-d to the abdomen data. The distortion for the chest data set is generally lower, since the rendered image is more transparent. For the chest data set, HQ yields a virtually lossless de facto compression ratio of 7.7:1 and 6.4:1 for the abdomen data set. The lossless compression ratios our Huffman variant achieves for the wavelet transformed blocks are 2.2:1 and 2.7:1, respectively. Thus, the adaptive decompression enhances the existing lossless compression ratio by a factor of 2.4-3.5. As for the heart data set, HQ yields low distortion for the regions with high TF content, whereas the distortion of the Uni and RecE schemes is more evenly spread.

Figure 6A:
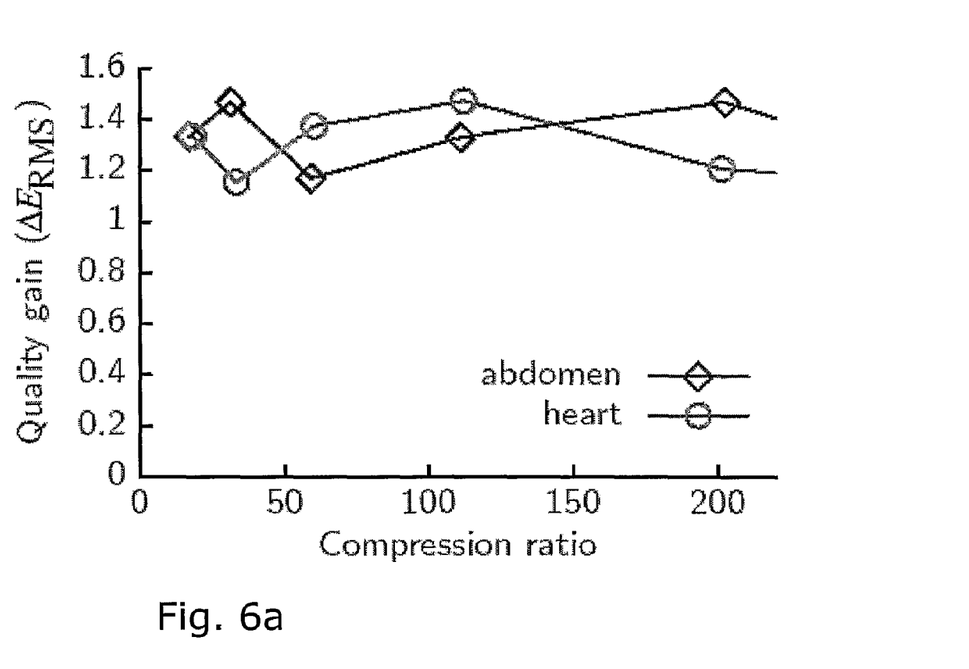
FIGS. 6a and 6b show the quality gain with occlusion correction of the significance measures for the High Quality scheme.
Figure 6B:
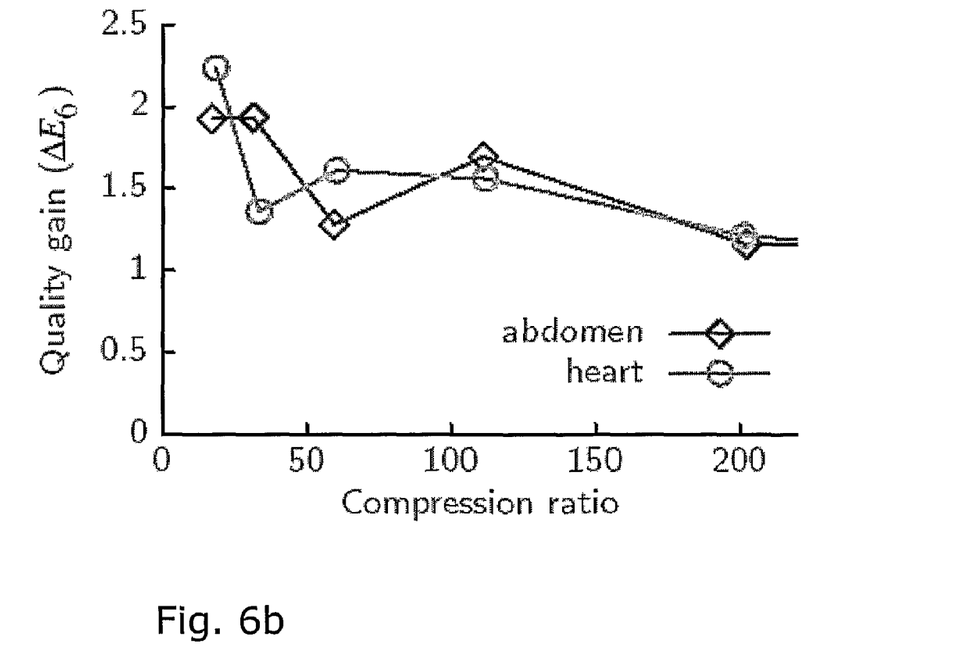

Using the TF as input for an occlusion factor estimation proves efficient for high-opacity TFs as shown in FIG. 6a-b. The quality gain with occlusion correction of the significance measures for the High Quality scheme is shown in FIGS. 6a-b. The gains are defined as $\Delta E_{RMS}^{without}/\Delta E_{RMS}^{with}$ and $\Delta E_6^{without}/\Delta E_6^{with}$, respectively. The $\Delta E_{RMS}$ distortion is typically reduced by a factor of 1.3 and the number of larger error pixels, $\Delta E_6$, are reduced even more. The gain is defined is the distortion without occlusion correction over distortion with correction.

The goal of the Fast adaptive decompression scheme is to get as close as possible to the qualitative results of the High Quality scheme (HQ) with minimum computational effort. Results are shown in FIGS. 5a-d. Their performances are similar at low compression ratios but the Fast scheme yields lower quality at medium and medium-high ratios. However, the Fast scheme is consistently better than both the Uni and RecE schemes.

A relevant performance measure is the throughput of the Fast scheme. In table 1 Fast LOD selection performance timings for calculating the significance measure (Sign), occlusion weighting (Occl) and extracting prioritized blocks from the priority queue (Prio) are shown. Tests were performed on a 3.2 GHz Intel P4 laptop PC.

TABLE 1

| Data set | Ratio | Sign | Occl | Prio | Total |
|---|---|---|---|---|---|
| Chest | 15.0:1 | 133 | — | 78 | 211 ms |
| Abdomen | 17.2:1 | 75 | 31 | 47 | 153 ms |
| Heart | 18.3:1 | 138 | 29 | 83 | 250 ms |

The results in table 1 show that it has the potential to fit in a real-time visualization pipeline. The full LOD selection process amounts to about 0.2 s on a 3.2 GHz PC. This is required when the TF is changed. When only the viewpoint is changed, only occlusion and prioritization need to be adjusted, requiring about half the processing time. The performance varies somewhat due to both data set and TF characteristics.

An example of LOD distribution of the High Quality (HQ) and Fast adaptive decompression according to the present invention at different compression ratios is shown in table 2. The last column (Disc.) reports discarded insignificant blocks.

TABLE 2

| Test | Method | $L_{16}$ | $L_8$ | $L_4$ | $L_2$ | $L_1$ | Disc |
|---|---|---|---|---|---|---|---|
| Chest 15:1 | HQ | 3710 | 3081 | 69 | 8 | 1563 | 24337 |
| Chest 15:1 | Fast | 3656 | 3365 | 1257 | — | 153 | 24337 |
| Chest 54:1 | HQ | 274 | 5980 | 178 | 14 | 1985 | 24337 |
| Chest 54:1 | Fast | 376 | 4855 | 2654 | — | 546 | 24337 |

Both schemes use all valid levels ($L_2$ is invalid for the Fast scheme), but HQ leaves more blocks at level $L_1$, prioritising transitions from intermediate to high levels.

Thus, while there have been shown and described and pointed out fundamental novel features of the invention as applied to embodiments thereof, it will be understood that various omissions and substitutions and changes in details of the methods described, and in their operation, may be made by those skilled in the art without departing from the spirit of the invention. For example, it is expressly intended that all combinations of those method steps which perform substantially the same function in substantially the same way to achieve the same results are within the scope of the invention. Moreover, it should be recognized that method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCES

Michael D. Adams. *The JPEG-2000 Still Image Compression Standard*. ISO/IEC (ITU-T SG8), September 2001. JTC 1/SC 29/WG 1: N 2412.

Katherine P. Andriole. A position paper from the scar trip(tm) subcommittee. http://www.scarnet.org/pdf/TRIPwhitepaper1103.pdf, November 2003. Acquired March 2004.

Chandrit Bajaj, Imsung Ihm, and Sanghun Park. Visualization-specific compression of large volume data. In *Proceedings Ninth Pacific Conference on Computer Graphics and Applications* 2001, pages 212-222, 2001.

C. M. Brislawn. Preservation of subband symmetry in multirate signal coding. *IEEE Transactions on Signal Processing*, 43(12):3046-3050, December 1995.

A. R. Calderbank, Ingrid Daubechies, Wim Sweldens, and Boon-Lock Yeo. Wavelet transforms that map integers to integers. Technical report, Department of Mathematics, Princeton University, August 1996.

Klaus Engel, Martin Kraus, and Thomas Ertl. High-quality preintegrated volume rendering using hardware-accelerated pixel shading. In *Eurographics/SIGGRAPH Workshop on Graphics Hardware*, pages 9-16, 2001.

Mark D. Fairchild. *Color Appearance Models*. Addison Wesley Longman, Inc., 1998.

Geneva: ITU. *ITU-R Recommendation BT.709: Basic Parameter Values for the HDTV Standard for the Studio and for International Programme Exchange (1990)*, 1990. Formerly CCIR Rec. 709.

Stefan Guthe, Michael Wand, Julius Gonser, and Wolfgang Straβer. Interactive rendering of large volume data sets. In *Proceedings IEEE Visualization* 2002, pages 53-60, 2002.

D. A. Huffman. A method for the construction of minimum-redundancy codes. In *Proceedings IRE*, volume 40, pages 1098-1101, September 1952.

Arie Kaufman. *Volume Visualization (Tutorial)*. IEEE Computer Society Press, 1991.

Eric C. LaMar, Bernd Hamann, and Kenneth I. Joy. Multi-resolution techniques for interactive texture-based volume visualization. In *Proceedings IEEE Visualization 1999*, pages 355-362, 1999.

Xinyue Li and Han-Wei Shen. Time-critical multiresolution volume rendering using 3d texture mapping hardware. In *Proceedings IEEE Visualization 2002*, 2002.

Ky Giang Nguyen and Dietmar Saupe. Rapid high quality compression of volume data for visualization. *Computer Graphics Forum*, 20(3), 2001.

Charles Poynton. Frequently asked questions about color. http://www.poynton.com/PDFs/ColorFAQ.pdf, March 1997. Acquired January 2004.

Jens Schneider and Rüdiger Westermann. Compression domain volume rendering. In *Proceedings IEEE Visualization 2003*, 2003.

Bong-Soo Sohn, Chandrit Bajaj, and Vinay Siddavanahalli. Feature based volumetric video compression for interactive playback. In *Proceedings IEEE Visualization 2002*, 2002.

Wim Sweldens. The lifting scheme: A custom-design construction of biorthogonal wavelets. *Journal of Applied and Computational Harmonic Analysis*, (3):186-200, 1996.

Manfred Weiler, Rudiger Westermann, Chuck Hansen, Kurt Zimmerman, and Thomas Ertl. Level-of-detail volume rendering via 3d textures. In *Proceedings IEEE Volume Visualization and Graphics Symposium 2000*, pages 7-13, 2000.

Rüdiger Westermann. A multiresolution framework for volume rendering. In *1994 Symposium on Volume Visualization*, October 1994.

The invention claimed is:

1. A method for reducing an amount of data to be processed in a visualization pipeline and rendering an image based on the reduced amount of data, the method comprising carrying out with a computer:

data capture;

data compression comprising dividing the data into blocks;

data storage;

data decompression;

image rendering comprising the use of a transfer function wherein reducing the amount of data comprises adaptively selecting a level-of-detail for each block in the data decompression utilizing a block-specific significance measure based on said transfer function.

2. The method according to claim 1, wherein the data is volumetric data and the rendering method is Direct Volume Rendering.

3. The method according to claim 1, wherein the data after division into blocks further is transformed into a multi-resolution representation and encoded in the compression in the visualization pipeline, and wherein the data after the level-of-detail selection further is decoded, inverse transformed from the multi-resolution representation to the selected level-of-detail and deblocked in the decompression in the visualization pipeline.

4. The method according to claim 3, wherein said transform is the Discrete Wavelet Transform.

5. The method according to claim 1, wherein cubic blocks of size $2^j$, where j is an integer >0, are used, transformation into multi-resolution representation of the blocks is performed in the compression and j+1 different levels of detail, $\lambda = 2^j, 2^{j-1}, \ldots, 2^0$ corresponding to cubes with sides $2^j, 2^{j-1}, \ldots, 2^0$, respectively, are used, and wherein said significance measure is a high quality version significance measure, $s_{HQ}(\lambda)$, derived according to:

$$\tau^*(v) = \mathcal{L}_{(\tau_a(v)\tau_{RGB}(v))}$$

$$s_{HQ}(\lambda) = \left[\frac{1}{2^{3j}}\sum_p \Delta E(\tau^*(v_{p,\lambda}), \tau^*(v_{p,2^j}))^2\right]^{1/2} \quad \lambda = 2^{j-1}, \ldots, 2^0$$

wherein $\tau$ denotes the transfer function, $\tau_{RGB}$ denotes the RGB component vector, $\tau_a$ denotes the alpha component, $\mathcal{L}$ denotes the conversion of RGB to CIELUV color space, $\Delta E$ denotes the CIELUV distortion measure and $v_{p,\lambda}$ denotes the voxel value for the level-of-detail $\lambda$ at the full resolution position p, whereby each level-of-detail is expanded to full resolution through interpolation to fill the positions p.

6. The method according to claim 1, wherein cubic blocks of size $2^j$, where j is an integer >0, are used, wavelet transformation of the blocks is performed in the compression, j+1 different levels of detail, $\lambda = 2^j, 2^{j-1}, \ldots, 2^0$ corresponding to cubes with sides $2^j, 2^{j-1}, \ldots, 2^0$, respectively, are used and block specific meta-data acquired in the compression are used, which meta-data comprises an average $\bar{x}$, a root mean square wavelet coefficient $C_{RMS}(\lambda)$ for each level-of-detail $\lambda$ and a simplified histogram, and wherein said significance measure is a fast version significance measure, $s_F(\lambda)$, derived according to:

$$\tau^*(v) = \mathcal{L}_{(\tau_a(v)\tau_{RGB}(v))}$$

$$s_F(1) = \left[\frac{1}{2^{3j}}\sum_i \Delta E(\tau^*(x_i), \tau^*(\bar{x}))^2 \cdot h_i \cdot w\right]^{1/2}$$

$$C_{acc}(\lambda) = \sum_{\lambda' > \lambda} C_{RMS}(\lambda') \quad \lambda = 2^{j-1}, \ldots, 2^0$$

$$s_F(\lambda) = s_F(1) \cdot \frac{C_{acc}(\lambda)}{C_{acc}(1)} \quad \lambda = 2^{j-1}, \ldots, 2^1$$

wherein $\tau$ denotes the transfer function, $\tau_{RGB}$ denotes the RGB component vector, $\tau_a$ denotes the alpha component, $\mathcal{L}$ denotes the conversion of RGB to CIELUV color space, $\Delta E$ denotes the CIELUV distortion measure, i denotes a histogram interval index, $x_i$ denotes a histogram interval midpoint, $h_i$ denotes a histogram interval height, w denotes a interval width and $C_{RMS}$ denotes a root mean square wavelet coefficient.

7. The method according to claim 1, wherein said adaptive selection of a level-of-detail for each block in the decompression utilizing a significance measure based on said transfer function is performed by utilizing a significance priority scheme based on said significance measure.

8. The method according to claim 7, wherein said significance priority scheme comprises:

removing each block with no significance according to said significance measure;

allocating each remaining block a current level-of-detail;

creating a priority queue comprising all valid transitions between different levels of detail for each remaining block, whereby a transition is valid when it goes from lower to higher level-of-detail;

sorting the priority queue according to a transition efficiency measure based on said significance measure, and traversing the priority queue of transitions from the top updating the current level-of-detail for remaining blocks.

9. The method according to claim 8, wherein said allocated current level-of-detail is the lowest level-of-detail used.

10. The method according to claim 8, wherein the priority queue is traversed until a stopping criterion is reached.

11. The method according to claim 10, wherein the stopping criterion is based on a defined compression ratio.

12. The method according to claim 8, wherein said transition efficiency measure is a relative significance measure.

13. The method according to claim 5, wherein said transition efficiency measure is a high quality version relative significance measure, $\Delta s_{HQ}(\lambda_a, \lambda_b)$, derived according to:

$$\Delta s_{HQ}(\lambda_a, \lambda_b) = \frac{s_{HQ}(\lambda_b) - s_{HQ}(\lambda_a)}{N_a - N_b} \quad \lambda_a > \lambda_b$$

wherein $N_i$ is the size of level $\lambda_i$.

14. The method according to claim 13, wherein said significance priority scheme is a high quality version significance priority scheme, which is iterative and in which the priority queue only comprises one valid level-of-detail transition at a time for a remaining block and a new valid transition is found and inserted into the priority queue when the current level-of-detail is updated.

15. The method according to claim 14, wherein said valid level-of-detail transition for a remaining block is the level-of-detail transition having the highest transition efficiency measure connected to the current level-of-detail.

16. The method according to claim 6, wherein said transition efficiency measure is a fast version relative significance measure, $\Delta s_F(\lambda_a, \lambda_b)$, derived according to:

$$\Delta s_F(\lambda_a, \lambda_b) = \frac{s_F(\lambda_b) - s_F(\lambda_a)}{N_a - N_b} \quad \lambda_a > \lambda_b$$

wherein $N_i$ is the size of level $\lambda_i$.

17. The method according to claim 16, wherein said significance priority scheme is a fast version significance priority scheme, which is non-iterative and in which each possible valid level-of-detail transition for a remaining block is comprised in the priority queue as a transition candidate.

18. The method according to claim 17, wherein said transition efficiency measure of a dependent transition is set below the value of its predecessor if said dependent transition is set higher in the queue than its predecessor.

19. The method according to claim 17, wherein a transition not starting at the current level-of-detail of a block is ignored.

20. The method according to claim 1, wherein the data is volumetric data and occlusion of a block is accounted for by weighting said significance measure with an average transparency in the rendering of the parts of the volume in front of the block at a current viewpoint.

21. The method according to claim 1, wherein said data is medical data.

22. A computer program product, comprising:
a computer readable storage media, and
computer program instructions stored on the computer readable medium and executable by a computer for performing a method for reducing an amount of data to be processed in a visualization pipeline and rendering an image based on the reduced amount of data, the method comprising
data capture;
data compression comprising dividing the data into blocks;
data storage;
data decompression;
image rendering comprising the use of a transfer function, wherein reducing the amount of data comprises adaptively selecting a level-of-detail for each block in the data decompression utilizing a block-specific significance measure based on said transfer function.

23. The computer program product, according to claim 22, wherein the computer program instructions are directly loadable into an internal memory of the computer.

24. An imaging system, comprising:
a computer configured to carry out a method for reducing an amount of data to be processed in a visualization pipeline and rendering an image based on the reduced amount of data, the method comprising
data capture;
data compression comprising dividing the data into blocks;
data storage;
data decompression;
image rendering comprising the use of a transfer function, wherein reducing the amount of data comprises adaptively selecting a level-of-detail for each block in the data decompression utilizing a block-specific significance measure based on said transfer function.

25. The imaging system according to claim 24, further comprising:
a picture archiving and communication system.

26. A method for reducing an amount of data to be processed in a visualization and rendering an image based on the reduced amount of data, the method comprising carrying out with a computer:
data capture;
data compression comprising dividing the data into blocks;
data storage;
data decompression;
image rendering comprising the use of a transfer function, wherein reducing the amount of data comprises adaptively selecting a level-of-detail for each block in the data decompression utilizing a block-specific significance measure based on said transfer function and a histogram of the data in the blocks.

* * * * *